Patented July 10, 1923.

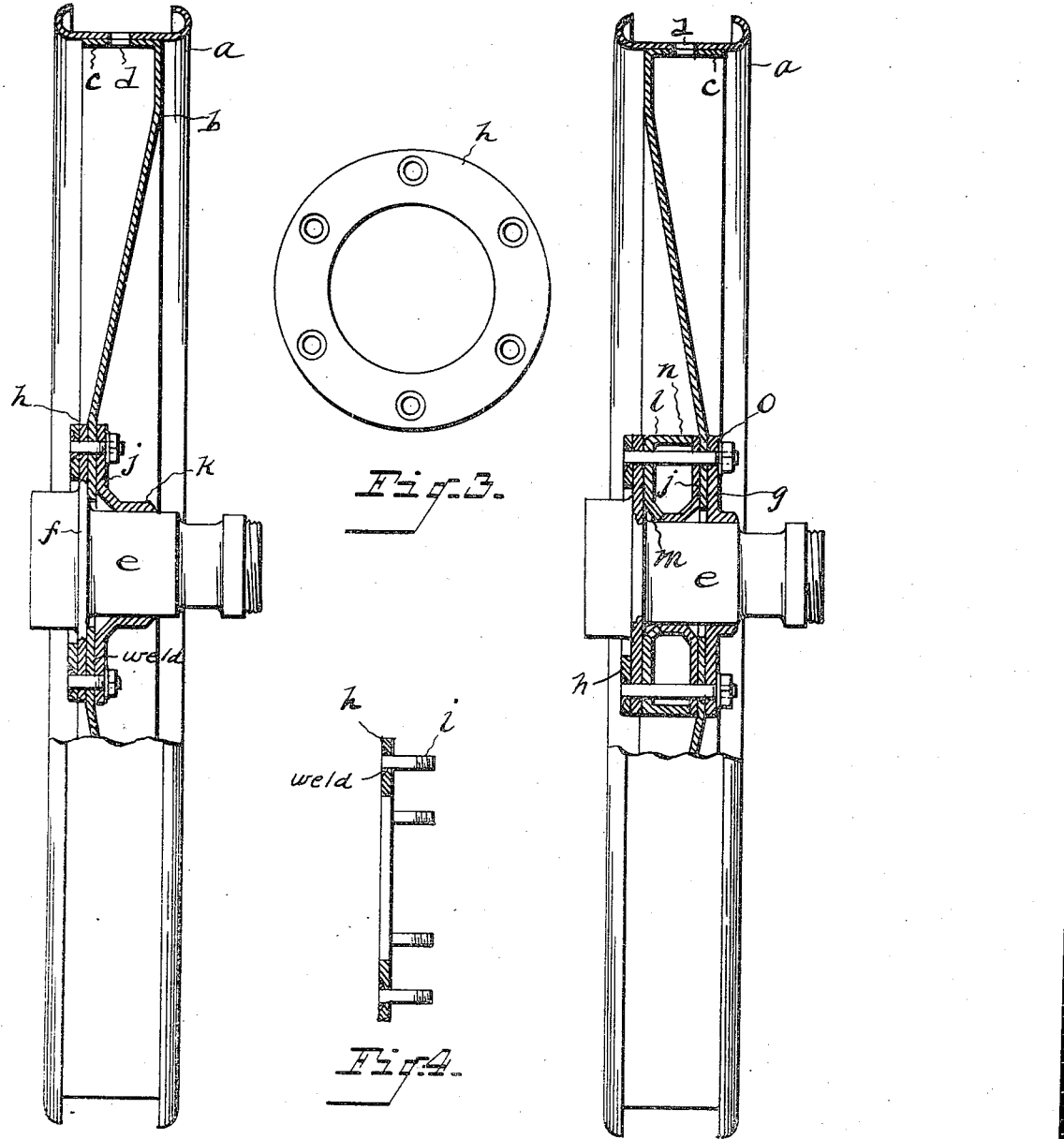

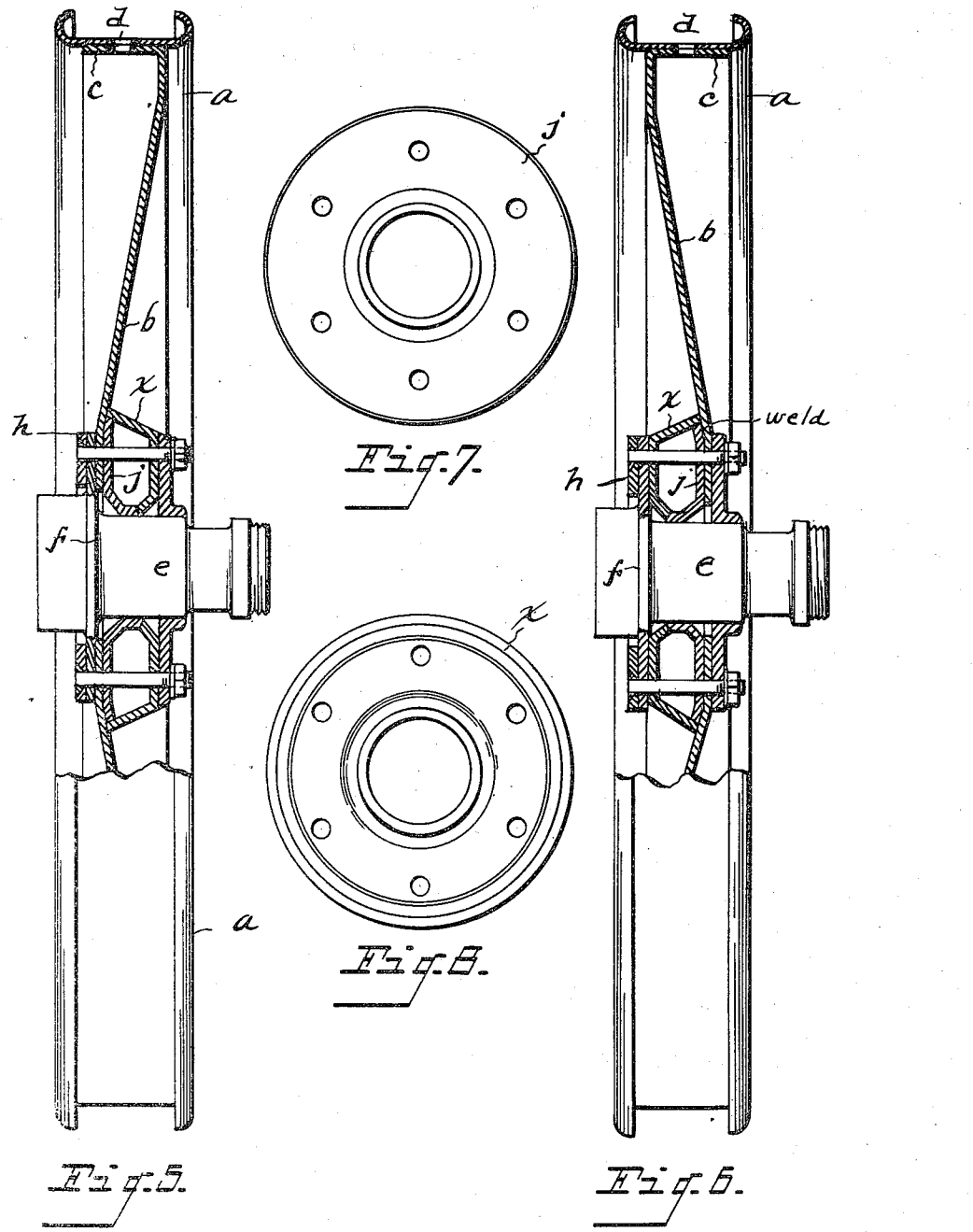

1,461,229

UNITED STATES PATENT OFFICE.

GEORGE D. SLAYMAKER, OF DETROIT, MICHIGAN, ASSIGNOR TO SLAYMAKER ELECTRIC WELDING COMPANY, A CORPORATION OF MICHIGAN.

DISK WHEEL.

Application filed August 11, 1919. Serial No. 316,580.

*To all whom it may concern:*

Be it known that I, GEORGE D. SLAYMAKER, a citizen of the United States, residing at Detroit, in the county of Wayne and State of Michigan, have invented certain new and useful Improvements in Disk Wheels, of which the following is a specification.

This invention relates to wheels, especially to disk wheels for automobiles, and has for its object a demountable disk wheel which can be attached to the spoke-retaining flange of the wheel hub on most automobiles by simply providing a special fastening means. By providing an additional spacing member the wheel is reversible so that it may present the tire valve to the outside of the disk instead of the inside.

Another feature of the hub construction is the novel stud-carrying ring which enables the nuts that secure the wheel to the hub to be manipulated solely from the outside and thereby afford a demountable wheel. This and other features will be better understood when the construction is described in detail.

In the drawings,—

Fig. 1 is a view largely in cross section of the disk wheel.

Fig. 2 is the same character of view of the same disk wheel but showing it reversed and a spacer interposed between the hub flange and the disk.

Fig. 3 is an elevation of the stud-carrying ring.

Fig. 4 is a cross section of the same.

Fig. 5 is a view largely in cross section showing a modified form.

Fig. 6 is a similar view showing the modified form reversed.

Fig. 7 is an elevation of the reinforcing nave used in the modified form.

Fig. 8 is an elevation of the spacing ring used in the modified form.

The disk wheel is here shown as carrying a rim $a$ that seats the tire and obviously a felloe could be employed with a detachable rim, but as this feature is no part of the invention such construction is not illustrated. The rim $a$ will be referred to in the claims as a rim and is to be taken to mean either a rim or felloe. A single disk $b$ is provided with the proper dish to give the appearance desired in disk wheels. Instead of being fastened to a depending flange of the rim, as is the conventional construction, the disk has a turned-over annular flange $c$ which is spot-welded or otherwise fastened at $d$ to the rim. This turned-over flange is concentric with the rim and being fastened at numerous points along the rim serves as a valuable reinforcement to strengthen the rim. The disk with its turned-over flange is a single stamping.

The conventional form of hub used on the front wheel of the Ford car is here illustrated and designated $e$, but the invention is obviously applicable to rear wheel hubs or to the hubs appearing on many well known makes of cars. $f$ designates the hub flange that is ordinarily the inside spoke-retaining member and which is perforated for the passage of a number of bolts that are ordinarily run through this flange $f$, the wooden spokes, and the outer spoke-retaining flange $g$ shown in Fig. 2. The wooden spokes (not shown) are clamped between the two hub flanges by bolts which are required to be held from turning on one side of the wheel while the nut is tightened on the other side.

With the form of demountable disk wheel shown in Figs. 1–4 the outer spoke-retaining flange $g$ is taken off from the conventional wooden spoke wheel and the spokes and rim are removed from the hub. The stud-carrying ring $h$ is then placed behind the inner spoke-retaining flange $f$, or, in the case of the rear wheel, behind the brake drum. This stud-carrying ring is illustrated in Figs. 3 and 4 and comprises simply a ring with perforations in which are preferably welded the screw studs $i$ so that they are non-rotatably and rigidly held in the stud-carrying ring. The studs on the stud-carrying ring are placed at such intervals as to register with the perforations in the hub flange $f$ so that when the ring is placed behind the flange the screw threads will protrude through the openings in the flange. The demountable disk wheel may then be mounted upon the hub simply by slipping the disk over the studs which pass through suitable perforations provided in the disk. However, to reinforce the disk wheel I think it better to employ a nave $j$ that is spot-welded or otherwise fastened to the center of the disk and which is provided with a ring portion $k$ that acts as a seat for the disk wheel upon the hub. Of course, the disk itself could be formed into a ring-like portion at the center and seat itself upon the hub, but I prefer the reinforcing nave which is spot-welded or otherwise fastened to the center of the disk. This enables the nave to be made of heavier stock than would otherwise be required for the disk $b$.

In Fig. 2 I have shown the same wheel but simply reversed. A stud-carrying ring with longer studs is required and some kind of a spacer. My special form of spacer $l$ has peculiar advantages in that it is provided with a central boss $m$ shaped to fit against the nave $j$ and with an outer annular flange $n$ which not only serves as a spacing element but completely houses the members contained within it to prevent the entry of dust and mud. The conventional outer spoke-retaining flange of the ordinary car can be here utilized, as shown in Fig. 2, for the purpose of aiding the seating of the disk wheel upon the hub and especially to give a more artistic appearance to the outside of the wheel.

In Figs. 5 to 8 inclusive a modified form of construction is shown in which the spacer $x$ is used in both positions of the wheel, that is, in reversed and unreversed position. The spacer is here shown separate from the reinforcing nave $j$ but it could be welded thereto so as to make the two a ring of hollow cross section, or the two might be cast or otherwise formed together. The advantage of this form of construction is that it enables the wheel to be reversed with a single stud-carrying ring $h$, the long studs being used in both positions of the wheel, and it possibly makes a more artistic job in the position of the wheel shown in Fig. 5. The annular flange of the spacer $x$ is made flaring instead of right angular as in Fig. 2.

It will readily be understood that by reason of the stud-carrying ring, all the screw studs are non-rotatably and rigidly held so that the wheel is made demountable from the hub simply by removing the nuts on the ends of the studs. Likewise the wheel may be mounted on the hub simply by fitting the holes in the disk and the nave over the studs and turning the nuts down against the lock washers $o$. No special form of hub cap and lock is required to hold the wheel upon the hub.

Most cars have the front and rear hub diameters the same, so that the demountable disk wheels may be mounted interchangeably upon the rear or front hubs. However, if the diameter of one pair of hubs is greater than the other, sleeves may be placed upon the other pair of hubs to compensate for the difference in diameter. In the rear wheel construction the stud-carrying ring would, of course, be inserted on the inside of the brake drum, the studs passing through the brake drum and the hub flange, but the principle of operation is precisely the same.

The great advantage in the construction above described is its applicability to the conventional form of hub used on wooden spoke wheels and the cheapness of manufacture. All that is required to make an operative wheel is the rim, the disk, and some means for holding the studs non-rotatably and rigidly to allow the mounting of the disk upon the studs and the running of the nuts down from the outside to demountably secure the wheel upon the hub.

Another feature of this disk wheel in combination with the spacing member is that the wheel can be made reversible on a hub whose flange is not approximately on the center line of the tread without altering the gauge of the wheels. Most disk wheels that are reversible require a hub flange whose outer face is approximately in the plane of the center line of the tread of the wheel to assemble the wheels reversibly without altering the wheel gauge.

What I claim is:

1. In combination with a hub provided with a flange provided with bolt holes and which is substantially offset from the plane of the center of the tread, a disk wheel provided with a central portion having bolt holes, a plurality of threaded studs passing through the said bolt openings in the flange and in the disk of the wheel, a stud-carrying ring for non-rotatably holding the inner ends of said studs, a spacer in the form of an annulus having bolt openings through which the said studs can pass and having an annular spacing and enclosing flange adapted to act as the spacing element between the outside of the hub flange and the central portion of the disk, and nuts that can be run on the ends of the bolts to fasten the wheel, spacer and flange together.

2. The combination of a hub provided with a flange offset from the plane of the center of the tread of the wheel, a disk wheel having a dished disk whose center is offset from the plane of the center line of the tread of the wheel and provided with means permitting the wheel to be detachably and reversibly mounted upon the hub with the offset flange without altering the wheel gauge.

In testimony whereof I affix my signature.

GEORGE D. SLAYMAKER.